UNITED STATES PATENT OFFICE.

MAX HENRY ISLER, OF MANNHEIM, AND PAUL NAWIASKY, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

ANTHRACENE COLORING-MATTERS AND PROCESS OF MAKING THEM.

1,057,243. Specification of Letters Patent. Patented Mar. 25, 1913.

No Drawing. Application filed July 1, 1911. Serial No. 636,491.

*To all whom it may concern:*

Be it known that we, MAX HENRY ISLER and PAUL NAWIASKY, a citizen of the Swiss Republic and a subject of the Emperor of Austria-Hungary, respectively, residing, respectively, at Mannheim and Ludwigshafen-on-the-Rhine, Germany, have invented new and useful Improvements in Anthracene Coloring-Matters and Processes of Making Them, of which the following is a specification.

We have found that by treating ortho-halogen-benzoyl-2-amino-anthraquinone, or derivatives thereof, with a body having an alkaline reaction, such for instance as sodium carbonate, sodium bicarbonate, potassium carbonate, and the like, they can obtain new condensation products which will dye extremely fast shades on cotton and wool from a hydrosulfite vat. The aforesaid treatment is preferably carried out in the presence of an indifferent solvent, such as nitrobenzene or naphthalene, and it is also advantageous to have a catalytic agent, such as copper, copper oxid, or copper chlorid, present during the reaction.

The ortho-halogen-benzoyl-2-amino-anthraquinone compounds which are used, as aforesaid, for the production of the coloring matters can be obtained, for instance, by boiling a 2-amino-anthraquinone body with an ortho-halogen-benzoyl-halogenid, or a derivative thereof, in the presence of nitrobenzene.

Under the term a 2-amino-anthraquinone body, we include 2-amino-anthraquinone itself and also such compounds as 2,6-diamino-anthraquinone, 2,7-diamino-anthraquinone, 2-amino-6-chlor-anthraquinone, 2-amino-6-hydroxy-anthraquinone, and 2-amino-7-hydroxy-anthraquinone. Under the term derivative of ortho-halogen-benzoyl-halogenid we include such compounds for instance as nitro-, halogen- and methoxy-derivatives.

Our new coloring matters are characterized by containing nitrogen and being difficultly soluble in the ordinary solvents, but they are soluble in concentrated sulfuric acid yielding from blue to green solutions, which lose their blue to green color on the addition of strong nitric acid, and from the hydrosulfite vat the new coloring matters dye cotton from orange to red-orange shades of excellent fastness.

The products of the present invention differ from those obtainable according to Letters Patent No. 1,001,408.

The following are examples of how our invention can be carried into practical effect, but our invention is not confined to these examples. The parts are by weight.

Example 1: Boil together ten parts of ortho-chlor-benzoyl-2-amino-anthraquinone (obtainable by boiling 2-amino-anthraquinone with ortho-chlor-benzoyl-chlorid in the presence of nitrobenzene), twenty-five parts of nitrobenzene, or of naphthalene, one-fifth of a part of cuprous chlorid, and three parts of calcined sodium carbonate, until a test portion shows that the formation of coloring matter is complete. Filter the reaction mass at a temperature of from eighty to ninety degrees centigrade and wash the coloring matter with alcohol and then with dilute hydrochloric acid. The coloring matter thus obtained yields a greenish blue solution in sulfuric acid and, on the addition of water to this solution, the coloring matter can be obtained in the form of a red paste which is insoluble in water and dilute caustic soda solution and alcohol. This paste can be used directly for dyeing and, from a hydrosulfite vat, yields, on cotton, reddish orange shades of great fastness. It is not necessary to isolate the chlor-benzoyl-amino-anthraquinone, as the formation of coloring matter can be carried out, if desired, in the nitrobenzene solution in which the intermediate product has been produced. In a similar manner, other halogen-benzoyl-amino-anthraquinones can be employed in the manufacture of coloring matters according to this invention.

Example 2: Boil together, for a few hours in a reflux apparatus, twenty-five parts of nitrobenzene, one-fifth of a part of copper oxid, four parts of calcined sodium carbonate, and ten parts of the benzoyl compound obtainable by boiling one part of 2.6-diamino-anthraquinone with two parts of ortho-chlor-benzoyl-chlorid in the presence of nitrobenzene, and then work up the coloring matter as described in the foregoing Example 1.

It is soluble in concentrated sulfuric acid, the color of the solution being a pure blue, which on warming turns violet-blue. The addition of nitric acid to the sulfuric acid solution imparts a yellowish tinge to the solution. In a similar manner, the corresponding coloring matter can be obtained from 2.7-diamino-anthraquinone.

Example 3: Boil together ten parts of the benzoyl compound obtainable by boiling 2-amino-6-chlor-anthraquinone with ortho-chlor-benzoyl-chlorid in nitrobenzene solution, one-fifth of a part of copper oxid, three parts of calcined sodium carbonate, and twenty-five parts of nitrobenzene until the quantity of coloring matter present no longer increases. Then isolate the product as described in the foregoing Example 1. It yields a blue-green solution in concentrated sulfuric acid, which on warming turns pure blue. The addition of nitric acid renders the solution colorless or yellow. From a hydrosulfite vat it dyes cotton orange color.

Example 4: Convert ten parts of the benzoyl compound obtainable by boiling 2-amino-6-hydroxy-anthraquinone with ortho-chlor-benzoyl-chlorid in nitrobenzene solution, into coloring matter in the manner described in either of the foregoing examples. The product yields a blue solution in concentrated sulfuric acid and dyes cotton orange color. It is very difficultly soluble in boiling nitrobenzene. The coloring matter obtainable in a similar manner from 2-amino-7-hydroxy-anthraquinone yields shades of a somewhat bluer tinge.

Example 5: Boil together, for one hour, in a reflux apparatus, ten parts of the reaction product of 2-amino-anthraquinone on 2.4-dichlor-benzoyl-chlorid (obtainable, for instance, from 2.4-dichlor-benzoic acid and thionyl chlorid), one-fifth of a part of copper oxid, four parts of potassium carbonate and thirty-five parts of nitrobenzene, and then work up the result in the manner described in the foregoing Example 1. The product is a yellowish red powder which yields a greenish blue solution in concentrated sulfuric acid. It is difficultly soluble in the ordinary organic solvents, and is insoluble in water. It dyes cotton and wool, from the hydrosulfite vat, red-orange shades. If, in this example, 2.5-dichlor-benzoyl chlorid be employed a similar coloring matter is produced.

Example 6: Heat together, for one hour, in a reflux apparatus, in an oil-bath at two hundred and fifteen degrees centigrade, ten parts of the product of the reaction of 2-chlor-4-methoxy-5-brom-benzoyl chlorid on 2-amino-anthraquinone in the presence of nitrobenzene, one-fifth of a part of copper oxid, four parts of potassium carbonate, and thirty-five parts of nitrobenzene, and work up the product as described in the foregoing Example 1. It consists of a crystalline powder which yields a green-blue solution in concentrated sulfuric acid and dyes cotton and wool, from the vat, red-orange shades. The 2-chlor-4-methoxy-5-brom-benzoyl chlorid, employed according to this example, can be obtained by brominating 2-acetamino-4-methoxy toluol, oxidizing with permanganate, splitting off the acetyl group, and replacing the free amino group by chlorin, and then treating the 2-chlor-4-methoxy-5-brom-benzoic acid with thionyl chlorid.

Example 7: Heat together, for one hour, in a reflux apparatus in an oil-bath at two hundred and fifteen degrees centigrade, ten parts of the product obtainable by boiling 2-chlor-5-nitro-benzoyl-chlorid with 2-amino-anthraquinone in nitrobenzene, one-fifth of a part of copper powder, three parts of potassium carbonate, and thirty-five parts of nitrobenzene, and then isolate the coloring matter as described in the foregoing Example 1. It is very similar to the products obtained in the foregoing examples. The coloring matter produced in a similar manner from the product obtainable from 2-chlor-6-nitro-benzoyl chlorid and 2-amino-anthraquinone possesses very similar properties.

Now what we claim is:—

1. The process of producing coloring matters of the anthraquinone series by treating an ortho-halogen-benzoyl-2-amino-anthraquinone body with a body having an alkaline reaction.

2. The process of producing coloring matters of the anthraquinone series by treating ortho-chlor-benzoyl-2-amino-anthraquinone with sodium carbonate in the presence of nitrobenzene and cuprous chlorid.

3. As new articles of manufacture the coloring matters of the anthracene series which can be obtained by treating an ortho-halogen-benzoyl-2-amino-anthraquinone body with a body having an alkaline reaction, in the presence of a catalytic agent, which new coloring matters contain nitrogen and are difficultly soluble in the ordinary solvents but are soluble in concentrated sulfuric acid yielding from blue to green solutions, which lose their blue to green color on the addition of strong nitric acid, and which new coloring matters dye cotton, from the hydrosulfite vat, from orange to red-orange shades of excellent fastness.

4. As a new article of manufacture the coloring matter of the anthracene series which can be obtained by treating ortho-chlor-benzoyl-2-amino-anthraquinone with sodium carbonate in the presence of nitrobenzene and cuprous chlorid, which coloring matter contains nitrogen and is difficultly soluble in the ordinary solvents, but is soluble in concentrated sulfuric acid yielding a greenish blue solution which loses its greenish blue color on the addition of strong nitric acid, and which new coloring matter can be precipitated by means of water from its sulfuric acid solution in the form of a red precipitate, and which dyes cotton from a hydrosulfite vat reddish orange shades of excellent fastness.

In testimony whereof we have hereunto set our hands in the presence of two subscribing witnesses.

MAX HENRY ISLER.
PAUL NAWIASKY.

Witnesses:
ERNEST G. EHRHARDT,
J. ALEC. LLOYD.